United States Patent
Falk et al.

(10) Patent No.: US 8,477,945 B2
(45) Date of Patent: Jul. 2, 2013

(54) METHOD AND SERVER FOR PROVIDING A MOBILE KEY

(75) Inventors: Rainer Falk, Eching (DE); Christian Günther, Neubiberg (DE); Dirk Kröselberg, München (DE)

(73) Assignee: Siemens Aktiengesellschaft, Munich (DE)

( * ) Notice: Subject to any disclaimer, the term of this patent is extended or adjusted under 35 U.S.C. 154(b) by 1226 days.

(21) Appl. No.: 12/092,693

(22) PCT Filed: Oct. 30, 2006

(86) PCT No.: PCT/EP2006/067930
§ 371 (c)(1),
(2), (4) Date: Dec. 22, 2008

(87) PCT Pub. No.: WO2007/051776
PCT Pub. Date: May 10, 2007

(65) Prior Publication Data
US 2009/0193253 A1    Jul. 30, 2009

(30) Foreign Application Priority Data

Nov. 4, 2005 (DE) .......................... 10 2005 052 724
Feb. 24, 2006 (DE) .......................... 10 2006 008 745

(51) Int. Cl.
*H04L 29/06* (2006.01)
(52) U.S. Cl.
USPC .......................... 380/273; 380/255; 380/270
(58) Field of Classification Search
USPC ........................... 380/273, 255, 270
See application file for complete search history.

(56) References Cited

U.S. PATENT DOCUMENTS 7,298,847 B2 * 11/2007 Jing et al. ...................... 380/247
7,313,394 B2 * 12/2007 Bakshi ........................ 455/432.1

(Continued)

FOREIGN PATENT DOCUMENTS

| DE | 102005052724.8 | 11/2005 |
| DE | 102006008745.3 | 2/2006 |

(Continued)

OTHER PUBLICATIONS

D. Kim et al.; "Architecture for 3G and 802.16 Wireless Networks Integration with QoS Support"; Proceedings of the 2nd Int'l Conf. on Quality of Service in Heterogeneous Wired/Wireless Networks; IEEE Computer Society; Aug. 2005; 8 pp.

(Continued)

*Primary Examiner* — Edan Orgad
*Assistant Examiner* — Bradley Holder
(74) *Attorney, Agent, or Firm* — Staas & Halsey LLP

(57) ABSTRACT

After a radio link is established between a mobile subscriber terminal and an access network, the subscriber is authenticated by a proxy server of an intermediate network forwarding, from the access network to a home network of the subscriber, authentication message(s) containing a subscriber identification. If the subscriber is authenticated and the subscriber identification is already stored in the proxy server, the proxy server assigns a group-specific mobile key to the subscriber identification. When the home agent receives a registration request message originating from a subscriber terminal and containing a subscriber identification and transmits a key request message, containing the subscriber identification, for a mobile key to the proxy server, if the subscriber identification in the key request message matches a subscriber identification stored by the proxy server, a mobile key for cryptographic protection of mobile signalling messages is provided to the home agent by the proxy server.

35 Claims, 8 Drawing Sheets

U.S. PATENT DOCUMENTS

| | | | |
|---|---|---|---|
| 7,424,605 B2 | 9/2008 | Arai | |
| 7,475,241 B2* | 1/2009 | Patel et al. | 713/155 |
| 7,639,802 B2* | 12/2009 | Gundavelli et al. | 380/44 |
| 7,774,828 B2 | 8/2010 | Benenati et al. | |
| 7,983,229 B2* | 7/2011 | Bachmann et al. | 370/338 |
| 2002/0120844 A1* | 8/2002 | Faccin et al. | 713/168 |
| 2002/0191572 A1* | 12/2002 | Weinstein et al. | 370/338 |
| 2003/0115460 A1 | 6/2003 | Arai | |
| 2003/0147537 A1* | 8/2003 | Jing et al. | 380/277 |
| 2004/0193712 A1 | 9/2004 | Benenati et al. | |
| 2005/0025091 A1* | 2/2005 | Patel et al. | 370/328 |
| 2006/0072517 A1* | 4/2006 | Barrow et al. | 370/335 |
| 2006/0072759 A1* | 4/2006 | Gundavelli et al. | 380/270 |
| 2007/0016774 A1* | 1/2007 | Bakshi | 713/168 |
| 2007/0086382 A1* | 4/2007 | Narayanan et al. | 370/331 |
| 2007/0143600 A1* | 6/2007 | Kellil et al. | 713/163 |
| 2007/0208864 A1* | 9/2007 | Flynn et al. | 709/227 |
| 2008/0165740 A1* | 7/2008 | Bachmann et al. | 370/332 |

FOREIGN PATENT DOCUMENTS

| | | |
|---|---|---|
| JP | 2003-188885 | 7/2003 |
| JP | 2004-304804 | 10/2004 |
| WO | WO 2005/062951 A2 * | 7/2005 |
| WO | 2007/011995 A1 | 1/2007 |

OTHER PUBLICATIONS

Part 16: Air Interface for Fixed and Mobile Broadband Wireless Access Systems; Amendments for Physical and Medium Access Control Layers for Combined Fixed and Mobile Operation in Licensed Bands; Draft IEEE Standard P802.16e/D11; Sep. 2005; pp. i-xxvii, 1-658.

Part 16: Air Interface for Fixed Broadband Wireless Access Systems; IEEE Standard 802.16-2001; 2001; pp. i-xxvii, 1-184.

M. Nakhjiri et al.; "EAP Based Proxy Mobile IP Key Bootstrapping for WiMax"; Internet Engineering Task Force Standard-Working-Draft; Jan. 2005; pp. 1-10.

C. Perkins, ed.; "IP Mobility Support"; Network Working Group; RFC 2002; Oct. 1996; pp. 1-71.

"Configuring Proxy Mobile IP" in Cisco Airnet 1200 Series Access Point Software Configuration Guide for VxWorks; Mar. 2006; pp. 1-21.

"cdma2000 Wireless IP Network Standard: Simple IP and Mobile IP Services"; 3GPP2 X.S0011-002C; Version 2.0; 3rd Generation Partnership Project 2; Jul. 2005; pp. i-iii, 1-42.

"WiMax End-to-End Network Systems Architecture (Stage 2: Architecture Tenets, Reference Model and Reference Points)"; WiMax Forum; Sep. 2005 Draft; pp. i-xiii, 1-249.

3rd Generation Partnership Project; Technical Specification Group Service and System Aspects; 3G Security; WLAN Interworking Security; (Release 6); 3GPP TS 33.234 V0.6.0; Sep. 2003; pp. 1-47.

3rd Generation Partnership Project; Technical Specification Group Service and System Aspects; 3GPP system to Wireless Local Araea Network (WLAN) interworking; System description (Release 6); 3GPP TS 23.234 V6.6.0; Sep. 2005; 80 pp.

S. Glass et al. "Mobile IP Authentication, Authorization, and Accounting Requirements";Network Working Group; RFC 2977;Oct. 2000; pp. 1-27.

C. Perkins, Ed.; "IP Mobility Support for IPv4"; Network Working Group; RFC 3344; Aug. 2002; pp. 1-99.

B. Aboba et al.; "Extensible Authentication Protocol (EAP)"; Network Working Group; RFC 3748; Jun. 2004; pp. 1-67.

F. Johansson et al.; "Mobile IPv4 Extension for Carrying Network Access Identifiers"; Network Working Group; RFC 3846; Jun. 2004; pp. 1-8.

C. Perkins et al.; "Authentication, Authorization, and Accounting (AAA) Registration Keys for Mobile IPv4"; Network Working Group; RFC 3957; Mar. 2005; pp. 1-27.

P. Calhoun et al.; "Diameter Mobile IPv4 Application"; Network Working Group; RFC 4004; Aug. 2005; pp. 1-53.

A. Patel et al.; "Authentication Protocol for Mobile IPv6"; Network Working Group; RFC 4285; Jan. 2006; pp. 1-19.

D. Johnson et al.; "Mobility Support in IPv6"; Network Working Group; RFC 3775; Jun. 2004; pp. 1-165.

J. Arkko et al.; "Using IPsec to Protect Mobile IPv6 Signaling Between Mobile Nodes and Home Agents"; Network Working Group; RFC 3776; Jun. 2004; pp. 1-40.

International Search Report for Application No. PCT/EP2006/067930; mailed Mar. 20, 2007.

Translation of Japanese Office Action for Patent Application No. 2008-539397; mailed Jan. 28, 2011.

* cited by examiner

FIG 1
Prior art

Mobility binding table

| Home Address | Care-of-Address | Lifetime (ms) |
|---|---|---|
| 131.192.180.42 | 129.142.23.42 | 100 |
| 213.123.24.140 | 172.23.142.49 | 150 |
| ... | ... | ... |

FIG 2
Prior art

Visitor list

| Home Address | Home Agent Address | Media Address | Lifetime |
|---|---|---|---|
| 131.192.180.42 | 129.142.23.42 | 08-00-46-26-75-6A | 100 |
| 213.123.24.140 | 172.23.142.49 | 00-02-B3-77-43-00 | 150 |
| ... | ... | ... | ... |

FIG 9

| Subscriber identification | Mobile key | Type of key | Time stamp |
|---|---|---|---|
| user@vodafone.com | 1 2 A F | group specific-key | 17.2.2006  $13^{10}$ |
| Glyn@isarpatent.com | 1 4 B C | user specific-key | 18.2.2006  $9^{14}$ |

United States Patent US 8,477,945 B2

METHOD AND SERVER FOR PROVIDING A MOBILE KEY

CROSS REFERENCE TO RELATED APPLICATIONS

This application is based on and hereby claims priority to German Application No. 10 2005 052 724.8 filed on Nov. 4, 2005 and German Application No. 10 2006 008 745.3 filed on Feb. 24, 2006, the contents of both of which are hereby incorporated by reference.

BACKGROUND

Described below is a method and a proxy server for providing a mobile key for the cryptographic protection of mobile signaling messages for a home agent of a mobile radio network, especially for anonymous subscribers.

The Internet with the TC/IP protocol enables a platform for the development of higher protocols for the mobile area. Because the Internet protocols are widespread, it is possible by suitable protocol expansions to open up a large group of subscribers for mobile environments. The Internet protocols were, however, not originally designed for mobile use. In the packet-switching of the Internet, the packets are exchanged between stationery computers which neither change their network address nor roam between different subnetworks. With mobile radio networks with mobile computers, mobile computers MS are frequently linked to various networks. The DHCP (Dynamic Host Configuration Protocol) enables the dynamic assignment of an IP address and other configuration parameters to a computer in a network with the aid of a suitable server. A computer which is linked into a network is automatically assigned a free IP address by the DHCP protocol. If a mobile computer has DHCP installed, it need only come within the range of a local network which supports the configuration by the DHCP protocol. With the DHCP protocol, a dynamic address allocation is possible, i.e. a free IP address is automatically allotted for a specific time. After this time has elapsed, the request must be renewed through the mobile computer or the IP address can otherwise be allocated.

By using the DHCP, the mobile computer can be linked into a network without manual configuration. The only precondition is that a DHCP server must be available. A mobile computer can thus use the services of the local network and, for example, use centrally stored files. If, however, a mobile computer itself offers services, a potential service subscriber cannot find the mobile computer because its IP address changes in each network to which the mobile computer is linked. The same thing occurs if an IP address changes during an existing TCP connection. This leads to a breakoff of the connection. Therefore, with a mobile IP a mobile computer is assigned an IP address which it also retains in a different network. With a known IP network change, it is necessary to adapt the IP address settings accordingly. However, a manual continuous matching of IP and routing configurations on the terminal is almost impossible. With the known automatic configuration mechanisms, the existing connection is broken off on a change of IP address. The Mobile Internet Protocol (MIP) (RFC 2002, RFC 2977, RFC 3344, RFC 3846, RFC 3957, RFC 3775, RFC 3776, RFC 4285) supports the mobility of mobile terminals. With known IP protocols, the mobile terminal has to adapt its IP address each time it changes the IP subnetwork, so that the data packets addressed to the mobile terminal can be correctly routed. To maintain an existing TCP connection, the mobile terminal has to retain its IP address, because an address change leads to an interruption in the connection. The MIP protocol resolves this conflict in that it enables a mobile terminal or a mobile node (MN) to have two IP addresses. The MIP protocol enables a transparent connection between both addresses, i.e. a permanent home address and a second temporary care-of address. The care-of address is the IP address under which the mobile terminal can currently be reached.

A home agent is an agent of the mobile terminal as long as the mobile terminal is not located in the original home network. The home agent is continuously informed of the current location of the mobile computer. The home agent normally constitutes a component of a router in the home network of the mobile terminal. If the mobile terminal is located outside the home network, the home agent provides a function to enable the mobile terminal to log on. The home agent then forwards the data packets addressed to the mobile terminal to the actual subnetwork of the mobile terminal.

A foreign agent is located in the subnetwork in which the mobile terminal moves. The foreign agent forwards incoming data packets to the mobile terminal or to the mobile computer. The foreign agent is located in a visited network. The foreign agent normally constitutes a component of a router. The foreign agent routes all administrative mobile data packets between the mobile terminal and its home agent. The foreign agent unpacks the tunneled IP data packets transmitted from the home agent and forwards their data to the mobile terminal.

The home address of the mobile terminal is the address under which the mobile terminal can be permanently reached. The home address has the same address prefix as the home agent. The care-of address is the particular IP address that the mobile terminal uses in the visited network.

The home agent manages a mobility binding table (MBT). The purpose of the entries in this table is to assign both addresses, i.e. the home address and the care-of address of a mobile terminal to each other and to reroute the data packets accordingly. The MBT table contains entries of the home address, the care-of address and details of the lifetime during which this assignment is valid. FIG. 1 shows an example of a mobility binding table according to the related art.

The foreign agent (FA) contains a visitor list (VL) containing information on the mobile terminals that are presently in the IP network of the foreign agent. FIG. 2 shows an example of such a visitor list according to the related art.

So that a mobile computer can be linked into a network it must first determine whether it is in its home network or a visited network. In addition, the mobile terminal must find out which computer in the subnetwork is the home or foreign agent. This information is determined by the so called agent discovery.

By the succeeding registration, the mobile terminal can inform his home agent of its current location. To do this, the mobile computer or mobile terminal sends the current care-of address to the home agent. For registration, the mobile computer sends a registration request to the home agent. The home agent (HA) enters the care-of address in its list and answers with a registration reply. This of course gives rise to a security problem. Because in principle each computer can send a registration request to a home agent, it would be quite easy to pretend to a home agent that a computer has moved to a different network. In this way, a foreign computer could collect all the data packets of a mobile computer or mobile terminal without a sender knowing. To prevent this, the mobile computer and the home agent have a common secret key. If a mobile computer returns to its home network it deregisters with the home agent, because the mobile computer can henceforth itself receive all the data packets. A mobile radio network must have the following main security properties. Information may be made accessible only to desired communication partners, i.e. unwanted listeners must not obtain access to transmitted data. The mobile radio network must thus have the properties of confidentiality. Furthermore authenticity must be given. Authenticity enables a communication partner to establish without doubt whether a communication has actually been established to a desired communication partner or whether a foreign party has pretended to be a communication partner. Authentication can be carried out per message or per connection. If authentication is based on connections, the communication partner is identified only once at the start of a session. It is then assumed for the further course of the session that the succeeding messages continue to originate from the corresponding sender. Even if the identity of a communication partner is established, i.e. the communication partner has been authenticated, the case can arise where this communication partner is not allowed to access all the resources or allowed to use all the services via the network. A suitable authorization in this case assumes a prior authentication of the communication partner.

With mobile data networks, messages have to cover longer sections via air interfaces and are thus easily accessible to potential attackers. With mobile and wireless data networks security aspects therefore play a particular role. Encryption techniques are an essential means for increasing security in data networks. Encryption makes it possible to transmit data via unsecured communication paths, for example via air interfaces, without the data being accessed by unauthorized third parties. For encryption, the data, i.e. the clear text, is transformed into ciphertext with the aid of an encryption algorithm. The encrypted text can be transmitted via the unsecured data transmission channel and then decoded or deciphered.

As a very promising wireless access technology, Worldwide Interoperability for Microwave Access (WiMax) is proposed as a new standard which is used for the IEEE 802.16 radio transmission. By using WiMax it should be possible for transmitting stations to cover an area of up to 50 km with data rates of more than 100 Mbit per second.

FIG. 3 shows a reference model for a WiMax radio network. A mobile terminal MS is located within the area of an Access Serving Network (ASN). The access network ASN is connected to a Home Connectivity Service Network (HCSN) by at least one Visited Connectivity Service Network (VCSN) or intermediate network. The various networks are connected to each other by interfaces or reference points R. The home agent HA of the mobile station (MS) is located in the home network HCSN or in one of the visited networks VCSN.

WiMax supports two realization variants of mobile IP, called Client MIP (CMIP) with which the mobile station itself realizes the MIP client function, and Proxy MIP (PMIP), with which the MIP client function is realized by the WiMax access network. The functionality provided for this in the ASN is called the Proxy Mobile Node (PMN) or PMIP client. In this way, MIP can also be used with mobile stations that do not themselves support MIP.

FIG. 4 shows a connection set-up with Proxy MIP according to the related art if the home agent is located in the visited network.

After establishment of a radio connection between the mobile terminal and a base station, an access authentication first takes place. The function of the authentication, the authorization and the accounting takes place by so-called AAA servers (AAA: Authentication Authorization and Accounting). Authentication messages, by which the address of the home agent and an authorization key are obtained, are exchanged between the mobile terminal MS and the AAA server of the home agent (HAAA). The authentication server in the home network contains the profile data of the subscriber. The AAA server receives an authentication request message that contains a subscriber identification of the mobile terminal. After successful access authentication, the AAA server generates a master session key (MSK) to protect the data transmission section between the mobile terminal MS and the base station of the access network ASN. This MSK key is transmitted from the AAA server of the home network via the intermediate network CSN to the access network ASN.

After the access authentication, the DHCP proxy server is configured in the access network ASN, as shown in FIG. 4. If the IP address and the host configuration are already contained in the AAA reply message, the complete information is downloaded to the DHCP proxy server.

After successful authentication and authorization, the mobile station, or the mobile terminal, MS sends a DHCP discovery message and an IP address assignment takes place.

If the access network ASN supports both PMIP and CMIP mobility, the foreign agent informs the ASN handover function by sending an R3 mobility context message. This can be omitted for networks that support only PMIP. After the home address has been read, it is forwarded to the PMIP client.

An MIP registration then takes place. The home agent is informed of the current location of the mobile terminal by the registration. For registration, the mobile computer sends the registration request, which contains the current care-of address, to the home agent. The home agent enters the care-of address in a list managed by the home agent and responds with a registration reply. Because in principle any computer can send registration requests to a home agent, it is easy to pretend to a home agent that a computer has moved to a different network. To prevent this the mobile computer and also the home agent have a common secret key, i.e. an MIP key. If the home agent (HA) does not recognize the MIP key, it asks it why it is in communication with a home AAA server.

On completion of the connection setup shown in FIG. 4, the mobile terminal will have received a home address and will be registered with the home agent.

The connection setup shown in FIG. 4 is of course not possible if the home AAA server does not supply the attributes or data expected by the WiMax protocol. If, for example, the home AAA server is a 3GPP server or other AAA server that does not support WiMax interworking, it will therefore not be able to provide the data attributes, especially the home address and a cryptographic key, necessary for the MIP registration. The home agent HA does not receive an MIP key (MSK: Master Session Key) and rejects the subscriber.

SUMMARY

An aspect is therefore to create a method for providing a mobile key for a mobile radio network, where the authentication server of the home network does not support MIP registration.

The method provides at least one mobile key for the cryptographic security of mobile signaling messages for a home agent, as follows:

Establishing a radio connection between a mobile subscriber terminal and an access network for authentication of the subscriber, with an authentication proxy server of an intermediate network forwarding at least one authentication message, which contains a subscriber identification, between the access network and a home network of the subscriber and if the authentication is successful a group-specific mobile key being assigned to the subscriber identification by an authentication server of the home network, provided the subscriber identification contained in the authentication message is already stored in the authentication proxy server;

Receipt by the home agent of a registration request message, originating from a subscriber terminal and containing a subscriber identification;

Transmission of a key request message for a mobile key, from the home agent to the associated authentication proxy server; with the key request message containing the subscriber identification contained in the registration request message; and Provision of a mobile key by the authentication proxy server for the home agent if the subscriber identification contained in the key request message agrees with one of the subscriber identifications stored by the authentication proxy server.

With an embodiment of the method, the authentication proxy server, if authentication by the authentication server of the home network is successful, generates a user-specific mobile key and assigns this to the subscriber identification if the subscriber identification contained in the authentication message is not yet stored in the authentication proxy server.

With an embodiment of the method, a generated user-specific mobile key is deleted by the authentication proxy server after a predetermined short lifetime.

With an embodiment of the method, a generated user-specific mobile key is deleted by the authentication proxy server after it has been provided to the home agent.

With an embodiment of the method, the group-specific mobile key is deleted by the authentication proxy server after a predetermined long lifetime.

With an embodiment of the method, the authentication proxy server updates a time stamp associated with the subscriber identification and sets an associated flag which indicates that the associated mobile key is a group-specific mobile key, if the subscriber identification contained in the authentication message is already stored in the authentication proxy server.

With an embodiment of the method the mobile key is randomly generated by the authentication proxy server.

With an embodiment of the method, if the authentication is successful the authentication server of the home network transmits an MSK key contained in the authentication message via the authentication proxy server to an authentication client of the access network.

With an alternative embodiment of the method, the mobile key is not randomly generated by the authentication proxy server but is instead derived by the authentication proxy server from the transmitted MSK key.

With an embodiment of the method, the mobile key forms a part of the transmitted MSK key.

With an alternative embodiment of the method, the mobile key is identical to the transmitted MSK key.

With an embodiment of the method, the authentication messages are transmitted according to a radius data transmission protocol.

With an alternative embodiment of the method, the authentication messages are transmitted according to a diameter data transmission protocol.

With an embodiment of the method, the access network is formed by a WiMax access network ASN.

With an embodiment of the method, the intermediate network is formed by a WiMax intermediate network CSN.

With a first embodiment of the method, the home network is a 3GPP network.

With an alternative embodiment of the method, the home network is formed by a network which provides an AAA infrastructure for WLAN subscribers (WLAN network).

With an embodiment of the method, the subscriber identification is formed by a network access identifier (NAI).

With an embodiment of the method, the mobile key is additionally provided to an PMIP client of the access network.

With an embodiment of the method, several intermediate networks are located between the access network and the home network.

With a first embodiment of the method the home agent is located in the home network.

With an alternative embodiment of the method the home agent is located in one of the intermediate networks.

With a first embodiment of the method the authentication proxy server is provided in the home network.

With an alternative embodiment of the method, the authentication proxy server is provided in one of the intermediate networks.

An authentication proxy server provides a mobile key for the cryptographic security of mobile signaling messages, with the authentication proxy server, after successful authentication of a subscriber by an authentication message that contains a subscriber identification, assigning a group-specific mobile key to the subscriber identification if the corresponding subscriber identification is already stored in the authentication proxy server.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 is an example of a mobility binding table according to the related art;

FIG. 2 is an example of a visitor list according to the related art;

FIG. 9 is an example of a table which is stored in an embodiment of the authentication proxy server.

DETAILED DESCRIPTION OF THE PREFERRED EMBODIMENT

Figure 3:
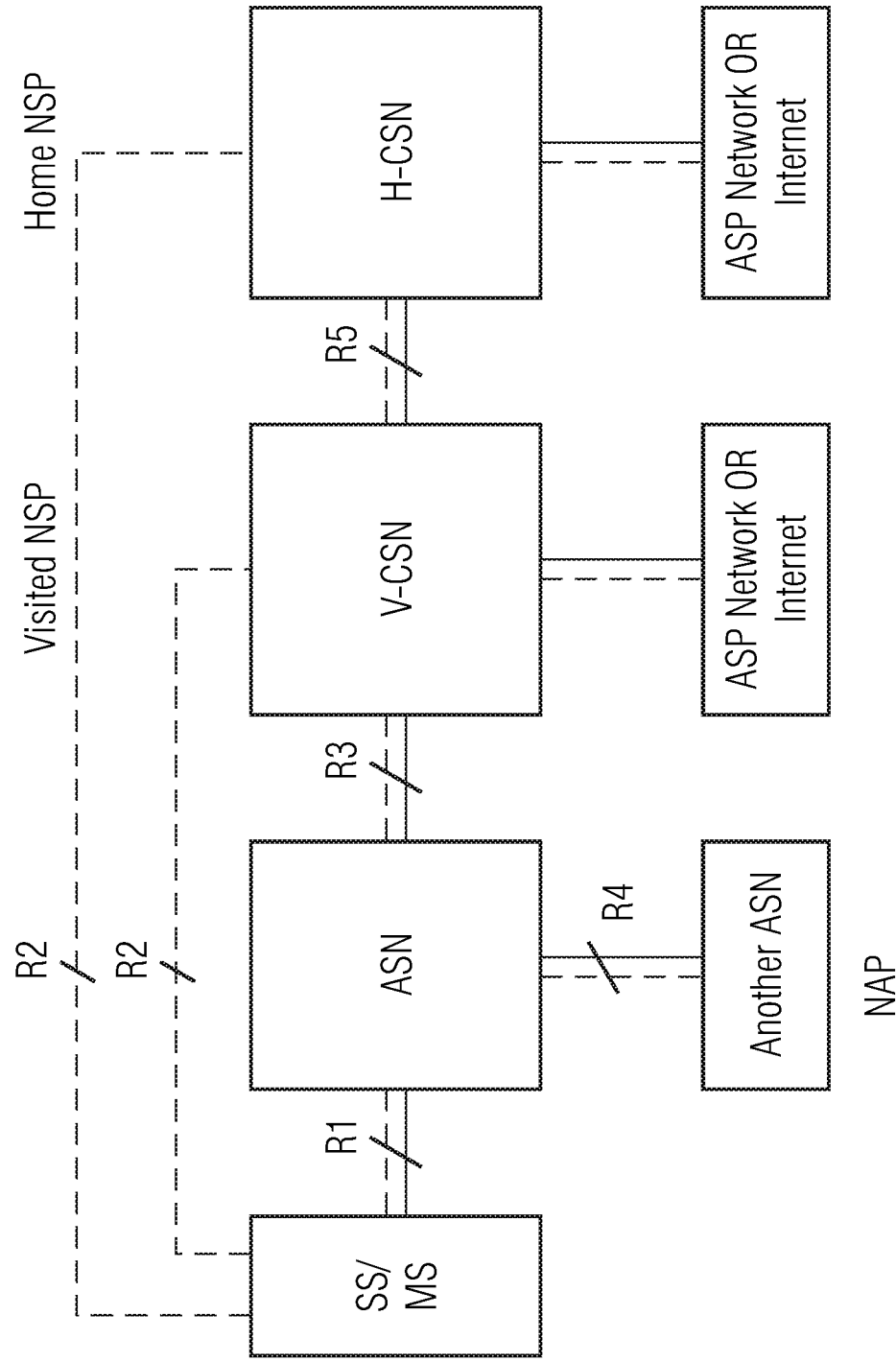
FIG. 3 is a block diagram of a reference network structure for a WiMax radio network.
Figure 4:
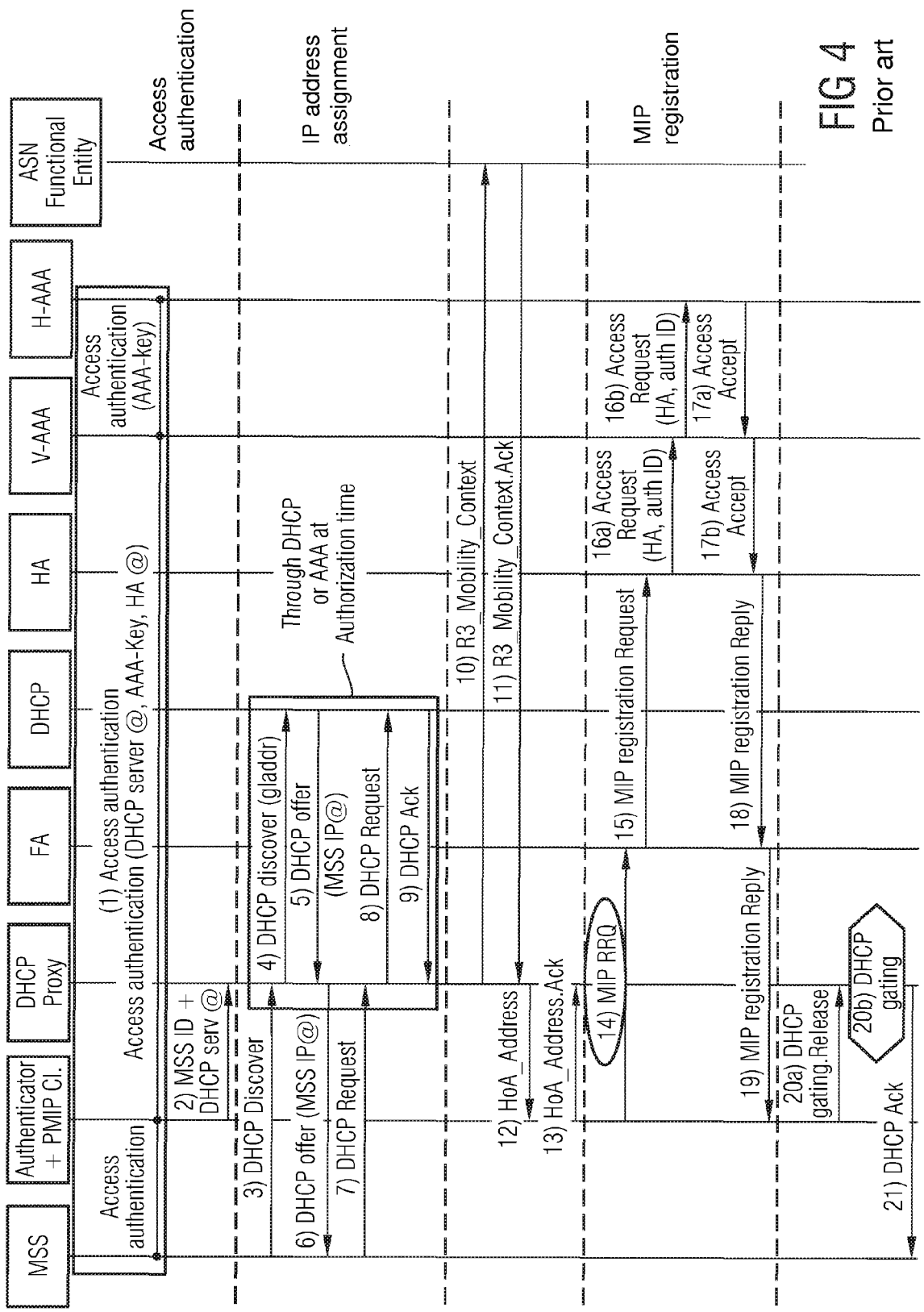
FIG. 4 is a signalling diagram for a connection setup for a known WiMax network according to the related art.

Reference will now be made in detail to the preferred embodiments, examples of which are illustrated in the accompanying drawings, wherein like reference numerals refer to like elements throughout.

Figure 5:
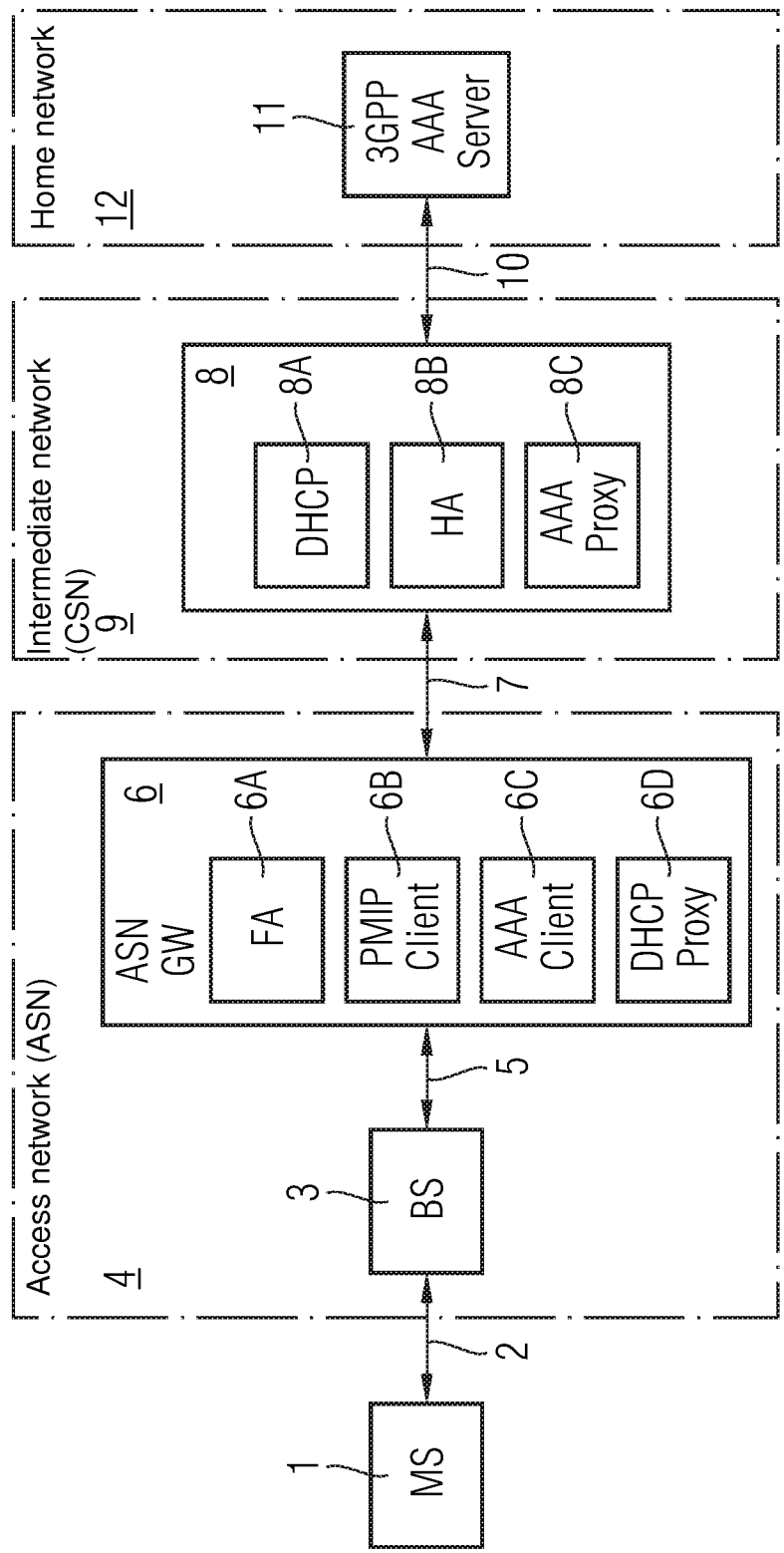
FIG. 5 is a block diagram of a network structure according to an embodiment of the method.

As can be seen from FIG. 5, a mobile terminal 1 is connected by a wireless interface 2 to a base station 3 of an access network 4. The mobile terminal 1 is any mobile terminal, for example a laptop, a PDA, a mobile telephone or other mobile terminal. The base station 3 of the access network 4 is connected by a data transmission line 5 to an access network gateway 6. Preferably, further functionality, especially a foreign agent 6A, a PMIP client 6B, an AAA client server 6C and a DHCP proxy server 6D, are integrated into the access gateway computer 6. The foreign agent 6A is a router which provides routing services for the mobile terminal 1. The data packets sent to the mobile terminal 1 are transmitted tunneled and are unpacked by the foreign agent 6A.

The gateway 6 of the access network 4 is connected via an interface 7 with a computer 8 of an intermediate network 9. The computer 8 contains a DHCP server 8A, a home agent 8B and an AAA proxy server 8C. The home agent 8B is the agent of the mobile terminal 1 when the mobile terminal 1 is not in its original home network. The home agent 8B is continuously informed of the current location of the mobile computer 1. Data packets for the mobile terminal 1 are first transmitted to the home agent and from the home agent are forwarded, tunneled, to the foreign agent 6A. Conversely, data packets sent from the mobile terminal 1 can be sent directly to the respective communication partner. The data packets of the mobile terminal 1 in this case contain the home address as the sender address. The home address has the same address prefix, i.e. network address and subnetwork address, as the home agent 8B. Data packets that are sent to the home address of the mobile terminal 1 are received by the home agent 8B and transmitted, tunneled, from the home agent 8B to the care-of address of the mobile terminal 1 and finally received at the end point of the tunnel, i.e. by the foreign agent 6A or the mobile terminal itself.

The computer 8 of the intermediate network 9 is connected by a further interface 10 to an authentication server 11 of a home network 12. The home network 12 is, for example, a 3GPP network for UMTS. With an alternative embodiment, the server 11 is an authentication server of a WLAN network. The authentication server 11 shown in FIG. 5 does not support MIP registration.

Immediately the AAA proxy server 8C of the computer 8 detects that the AAA server 11 of the home network 12 does not support MIP (CMIP/PMIP), the provision of a mobile key for the cryptographic protection of mobile signaling messages for the home agent 8B takes place in accordance with the method. The AAA proxy server 8B detects the absence of CMIP/PMIP support, for example by the fact that no MIP attributes are delivered by the server 11 of the home network 12 in response to its request. A common mobile key (MIP key) for the home agent 8B and the mobile terminal 1 for the PMIP case, or a common mobile key for the home agent 8B and a PMIP client 6B for the PMIP case, is required for the cryptographic protection of mobile signaling messages. If the home network 12 has WiMax interworking capability, the home agent 8B receives this MIP key from the AAA server of the home network 12. Of course if, as shown in FIG. 5, the AAA server 11 is not able to provide the required MIP attributes in response to the appropriate request of the home agent 8B the method is activated. The 3GPP-AAA server 11, as shown in FIG. 5, cannot provide a corresponding cryptographic key for protection of mobile signaling networks because it cannot interpret the request of the home agent 8B. With the method, the authentication server 11, which is not WiMax capable, of the home network 12 is left unchanged and the mobile key is provided by the AAA proxy server 8C to the home agent 8B. After it has been detected that the authentication server 11 of the home network 12 does not provide a mobile key, a proxy home MIP functionality, as it is referred to, is activated and a local data record from the authentication proxy server 8C is created for this AAA session. The functionality required for PMIP/CMIP is thus, not provided by the authentication server 11 of the home network 12, but instead by the AAA proxy server of the intermediate network 9, which is located in the communication path between the authentication server 11 of the 3GPP network and gateway 6 of the access network 4.

Figure 6:
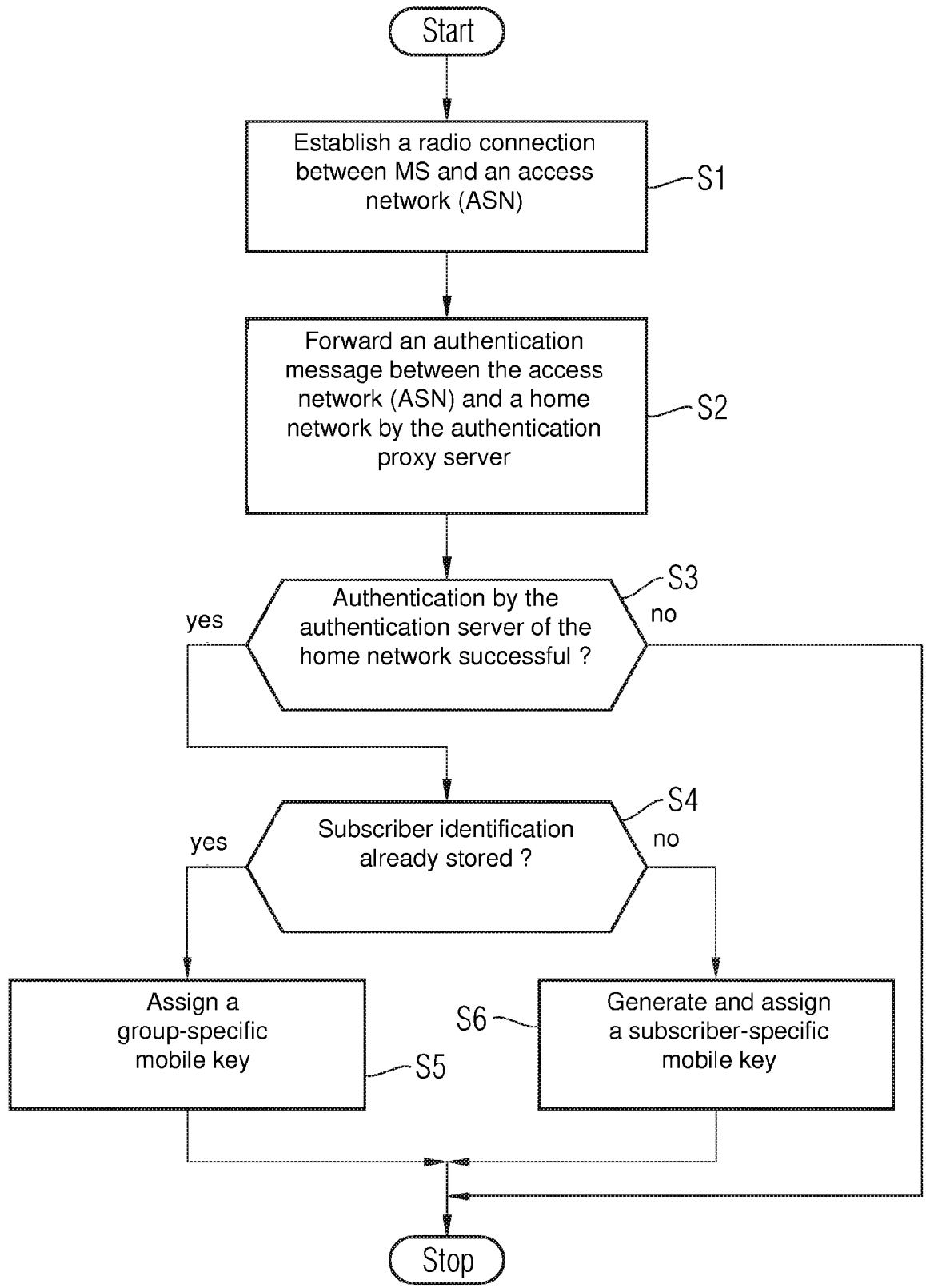
FIG. 6 is a flow diagram for explaining the functioning of the method.

FIG. 6 shows a flow diagram for the authentication of a mobile terminal 1 according to an embodiment.

After an initial step, a radio connection between the mobile terminal 1 and a base station 3 of the access network 4 is first setup in step S1. Authentication messages are then forwarded in step S2, between the access network 4 and the home network 12, by the authentication proxy server 8C of the intermediate network 9. The authentication messages contain a subscriber identification for identification of the respective mobile terminal 1. The subscriber identification is, for example, a network access identifier NAI. Alternatively, the subscriber identification is, for example, formed by a home address of the mobile terminal 1. The authentication messages forwarded by the AAA proxy server 8C reach the authentication server 11 of the home network 12. The authentication server 11 of the home network 12 then carries out an authentication of the subscriber. If the authentication is successful, the authentication server 11 sends a corresponding message via the authentication proxy server 8C of the intermediate network 9 to the access network 4. In step S3, the authentication proxy server 8C of the intermediate network 9 checks whether the authentication by the authentication server 11 of the home network 12 has been successfully completed. It detects this, for example by a corresponding success notification of the authentication server 11. If the authentication proxy server 8C detects, on the basis of the messages transmitted to the access network 4 from the home network 12, that the authentication of a subscriber has been successfully completed, the authentication proxy server 8C checks in step S4 whether the subscriber identification contained in the authentication message is already stored in the authentication proxy server 8C.

If the subscriber identification is already buffer stored in the authentication proxy server 8C, a group-specific mobile key is assigned, in step S5, to the subscriber identification. At the same time, a time stamp associated with the subscriber identification is preferably updated and an associated flag, which indicates that the associated mobile key is a group-specific mobile key, is also set. Identical or similar identifications are thus provided with an identical or group-specific mobile key by the authentication proxy server 8C. This enables the use of anonymous subscriber identifications or anonymous network access identifiers NAI. A subscriber identification is anonymous if it is not assigned uniquely to a specific subscriber. An example of such an anonymous subscriber identification is "user@vodafone.com", as shown in the first line of the table in FIG. 9. The group-specific mobile key for the example shown in FIG. 9 is "12AF". The type of mobile key is characterized as group-specific by a corresponding flag or "group-specific key" indicator.

If it is found in step S4 that the subscriber identification contained in the authentication message is not stored in the authentication proxy server 8C, a user-specific mobile key is generated in step S6 and assigned to the corresponding subscriber identification. The corresponding key is marked as subscriber-specific and the associated time stamp is updated. With the example shown in FIG. 9, the user-specific mobile key "14BC" is generated the first time the subscriber identification "glyn@isarpatent.com" occurs and is marked as a "user-specific key". With an embodiment, the user-specific mobile key is derived by the authentication proxy server 8C from a transmitted MSK key that is contained in an authentication message, which is transmitted via the authentication proxy server 8C to an authentication client 6C of the access network.

With an embodiment of the method, the group-specific mobile key assigned to step S5 is randomly generated by the authentication proxy server 8C. With the example shown in FIG. 9, if the subscriber identification "glyn@isarpatent.com" occurs again, another randomly generated group-specific mobile key is generated in the case of a first embodiment and, in the case of an alternative embodiment, if the subscriber identification reoccurs the existing mobile key "14BC" is marked as a group-specific key in that the "user-specific key" flag is overwritten by the "group-specific key" flag.

The method ensures that no collision or conflicts occur if two subscribers inadvertently or deliberately use the same subscriber identification.

With an embodiment of the method, the user-specific mobile key generated in step S6 is deleted after a preset short lifetime, for example after a few seconds, by the authentication proxy server 8C by using a time stamp.

The deletion of the group-specific mobile key of the anonymous subscribers takes place after a substantially longer lifetime, for example after a few hours or not at all. It is necessary that several PMIP subscribers that use the same anonymous subscriber identification can log on at the same time.

With an alternative embodiment of the method, the group-specific mobile key is not randomly generated, but is instead permanently preconfigured.

With the method, all anonymous subscribers are assigned the same mobile key. As a result, it is possible to use anonymous subscriber identifications as part of the authentication of the logon to a WiMax network. This makes possible the support of anonymous subscriber identifications or anonymous NAIs. The method also allows a significant simplification of the management of the security relationships necessary for mobile IP and PMIP. This leads to a distinctly reduced dynamic storage requirement.

Figure 7:
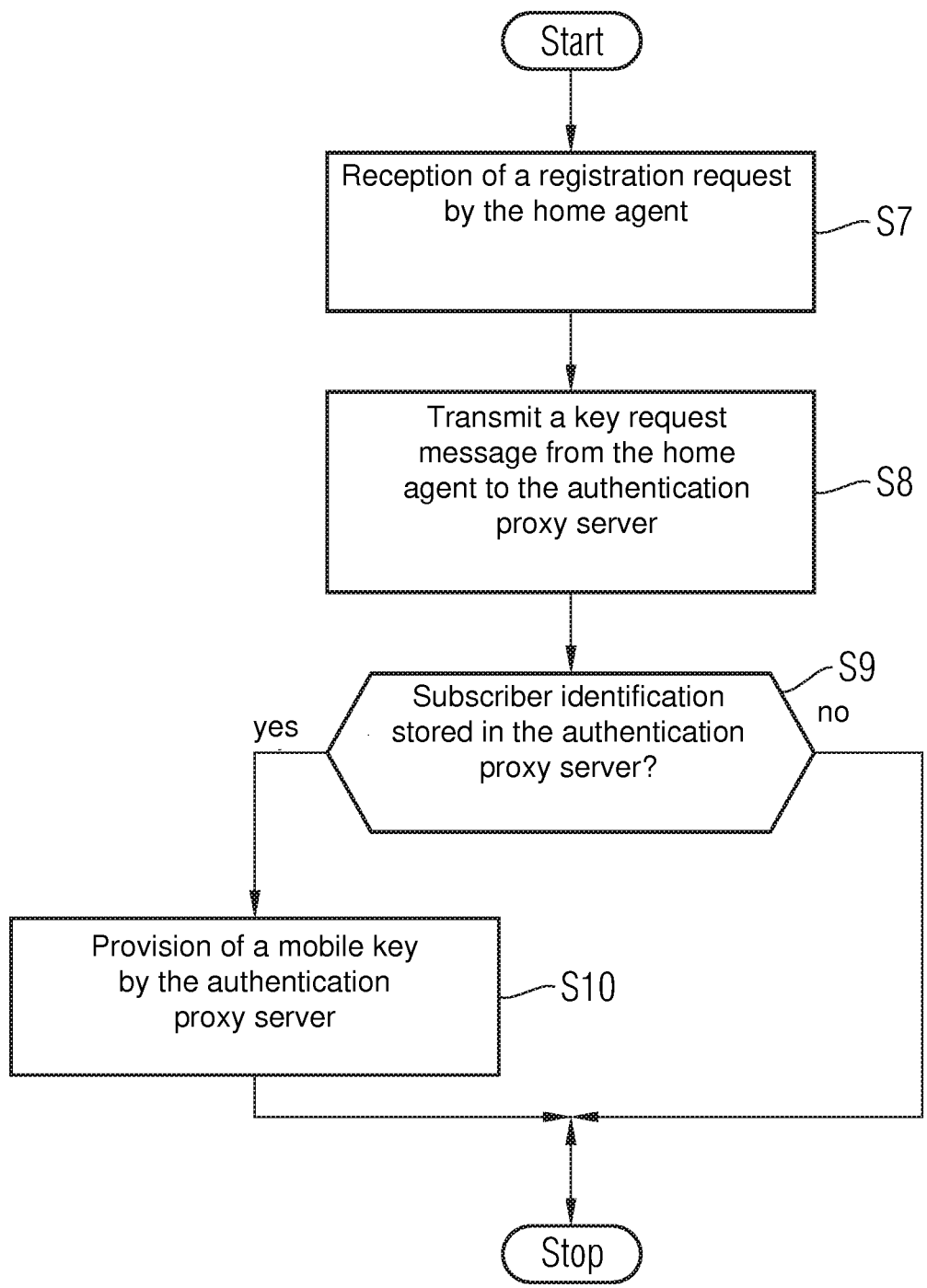
FIG. 7 is another flow diagram for explaining the functioning of the method.

As can be seen from FIG. 7, when the home agent 8B receives a registration request message at a later timepoint after an initial step, the home agent 8B, in step S8, sends a corresponding key request message to its authentication proxy server 8C. The received registration request message contains a subscriber identification of a mobile terminal 1. The key request message of the home agent 8B then generated at the automated proxy server 8C also contains this subscriber identification. The authentication proxy server 8C checks, in step S9, whether the subscriber identification contained in the key request message agrees with one of the subscriber identifications stored by it in step S4. If this is the case, the authentication proxy server 8C makes a mobile key available, in step S10, for the cryptographic protection of mobile signaling messages. The authentication proxy server 8C transfers the provided mobile key to the home agent 8B. Preferably, the mobile key is also transmitted to an authentication client server 6D of the access network 4.

With a first embodiment of the method, the mobile key provided in step S10 is randomly generated by the authentication proxy server 8C.

With an alternative embodiment, the mobile key (MIP key) is derived by the authentication proxy server 8C from an MSK (master session key) which the authentication proxy server 8C has forwarded from the authentication server 11 to the access network 4. In this case, the MIP key can be derived from the MSK key according to any key derivation function, for example by a hash function. The hash function reduces data of any size to a "fingerprint". An example of such a hash function is SHA-1. In this case, data with a maximum of $2^{64}$ bits is mapped to 160 bits. An alternative hash function is MD5. Like SHA-1, MD5 divides the input into blocks of 500-bit size and generates hash values of 128-bit size.

With an alternative embodiment, the mobile key made available is formed by a part of the MSK key 12 received from the authentication proxy server 8C.

In a further alternative embodiment, the provided mobile key is identical to the transmitted MSK key.

With an embodiment, the authentication messages are transmitted according to the radius or the diameter protocol.

With the method, the intermediate network 9 offers the home MIP functionality, if this is not supported by the home network 12. In this way, it is also possible to enable macro-mobility based on MIP for home networks that do not support MIP, for example with 3GPP networks. MIP is used within the access network 4 and the intermediate network 9 in order to realize a handover between different access networks 4. With the MIP registration of the foreign agent 6A, the home agent 8B of the intermediate network 9 requests the mobile key from the associated authentication proxy server 8C. To do so, it uses the relevant subscriber identification, i.e. for example a network access identifier NAI or the home address of the mobile terminal 1. This key request message is answered locally by the authentication proxy server 8C if a suitable data record is created. In order that the authentication proxy server 8C can provide the respective key, it is designed in such a way that it interprets the messages that are exchanged during the authentication of the mobile terminal 1 between the authentication server 11 of the home network 12 and an authenticator in the access network 4.

The home agent 8B is preferably located in the intermediate network 9, as shown in FIG. 5. With an alternative embodiment, the home agent 8B is in the home network 12.

With an alternative embodiment of the method, mobile IPV6 [RFC 3775] is used as the mobile IP functionality.

With an embodiment of the method, the mobile key is requested by the home agent 8B only once, by a key request message from the authentication proxy server 8C.

With the method, the use of legacy AAA servers, such as WLAN or 3GPP servers for WiMax networks is enabled although these servers do not provide the CMIP/PMIP functionality expected by WiMax networks. With the method, a PMIP-based macromobility is possible despite the use of legacy AAA servers in the home network 12. A network operator of a WLAN or 3GPP network need not therefore generally himself support PMIP and can nevertheless enable his customers to carry out roaming/interworking with WiMax radio networks. With the method, it is especially possible with the PMIP support to enable WiMax interworking without the support of mobile IP. In particular, the method enables a WiMax 3GPP interworking similar to the present specified WLAN direct IP access.

Figure 8:
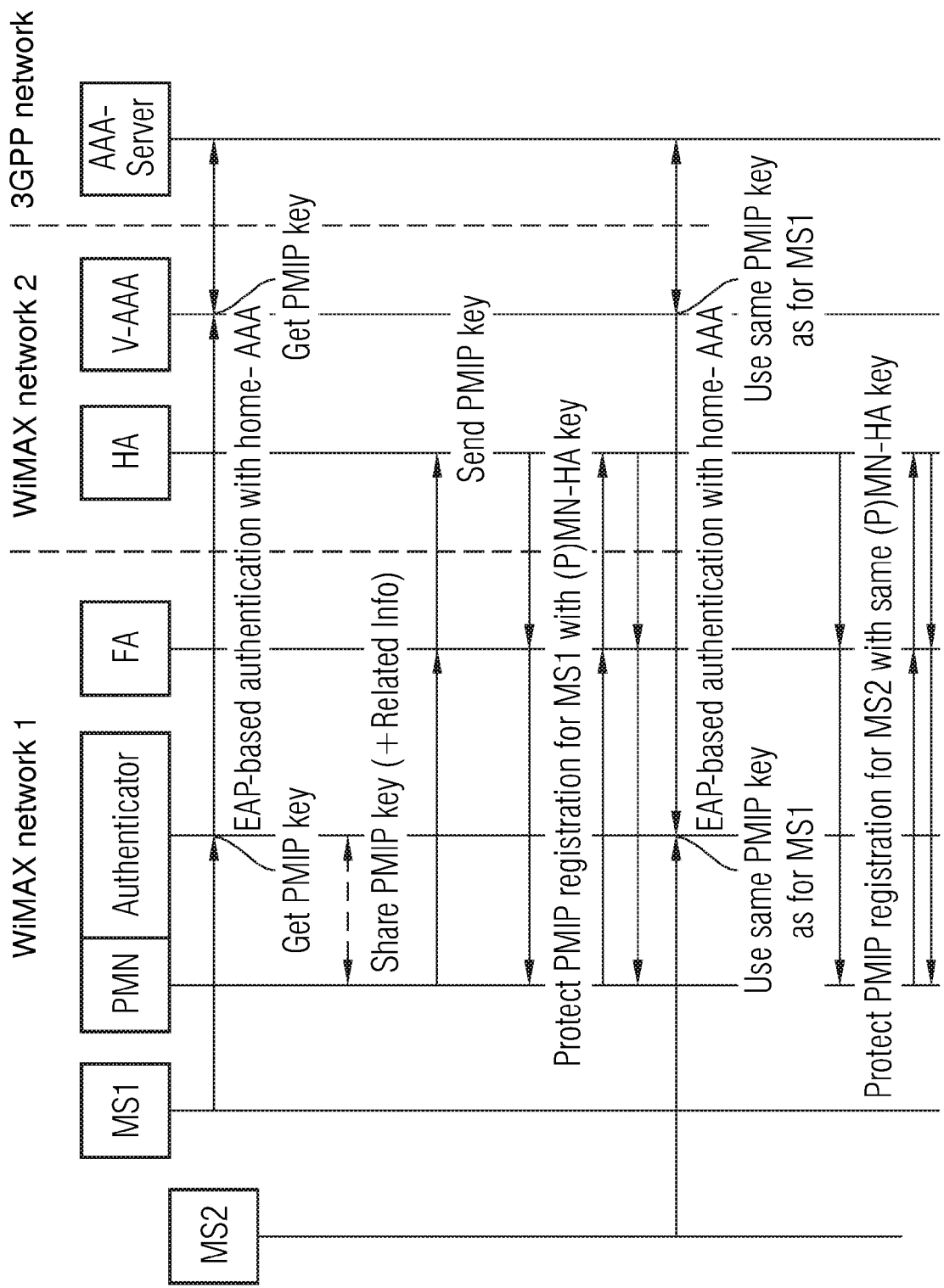
FIG. 8 is a signalling diagram for explaining the functioning of the method.

FIG. 8 shows a message flow diagram of an embodiment of the method. With the embodiment shown in FIG. 8, the access network 4 and the intermediate network 9 are each formed of a WiMax network. The home network 12 is formed by a 3GPP network. The authentication proxy server 8C provided in the intermediate network assigns the same group-specific mobile key to the mobile station MS2 as to the mobile station MS1, if the subscriber identification contained in the authentication message for the second mobile station MS2 is already stored in the authentication proxy server 8C of the WiMax network 2. According to the method, the key request message that contains the subscriber identification is answered by the authentication proxy server 8C of the intermediate network 9.

The method thus enables macromobility management in WiMax networks without home network support.

For clarification of the method, FIG. 9 shows an example of a table that, for example, is stored within the authentication proxy server 8C of the intermediate network 9.

The system also includes permanent or removable storage, such as magnetic and optical discs, RAM, ROM, etc. on which the process and data structures of the present invention can be stored and distributed. The processes can also be distributed via, for example, down-loading over a network such as the Internet. The system includes a programmed processor for executing the processes and can output the results to a display device, printer, readily accessible memory or another computer on a network.

A description has been provided with particular reference to exemplary embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for providing at least one mobile key for cryptographic protection of mobile signaling messages for a home agent via at least one intermediate network, comprising:
   establishing a radio connection between a mobile subscriber terminal and an access network, by an authentication proxy server, in one of the at least one intermediate network, forwarding at least one authentication message, that contains an authenticating subscriber identification, between the access network and a home network of a subscriber, for authentication of the subscriber and, if the authentication by an authentication server of the home network is successful, assigning a group-specific mobile key to the authenticating subscriber identification if the authenticating subscriber identification is already stored in the authentication proxy server;
   receiving, by the home agent in the home network or in one of the at least one intermediate network, a registration request message containing a registering subscriber identification and originating from a registering subscriber terminal;
   transmitting a key request message for a mobile key from the home agent to the authentication proxy server, with the key request message containing the registering subscriber identification;
   providing the group-specific mobile key to the home agent by the authentication proxy server if the registering subscriber identification agrees with a stored subscriber identification in the authentication proxy server; and
   deriving a user-specific mobile key by the authentication proxy server, assigning the user-specific mobile key to the authenticating subscriber identification and providing the user-specific mobile key to the home agent, if the authenticating subscriber identification is not stored in the authentication proxy server.

2. The method as claimed in claim 1, further comprising upon successful authentication by the authentication server, generating a user-specific mobile key.

3. The method as claimed in claim 1, further comprising: deleting the user-specific mobile key by the authentication proxy server after a first predetermined lifetime.

4. The method as claimed in claim 3, further comprising deleting the group-specific mobile key by the authentication proxy server after a second predetermined lifetime, longer than the first predetermined lifetime.

5. The method as claimed in claim 1, further comprising: deleting the user-specific mobile key by the authentication proxy server after providing the user-specific mobile key for the home agent.

6. The method as claimed in claim 1, further comprising: updating, by the authentication proxy server if the authenticating subscriber identification is already stored in the authentication proxy server, a time stamp associated with the authenticating subscriber identification; and setting an associated flag indicating that the mobile key provided to the home agent is the group-specific mobile key.

7. The method as claimed in claim 1, further comprising randomly generating the group-specific mobile key by the authentication proxy server.

8. The method as claimed in claim 1, further comprising transmitting, by the authentication server of the home network upon successful authentication, a master session key in an authentication message via the authentication proxy server to an authentication client of the access network.

9. The method as claimed in claim 8, further comprising deriving the user-specific mobile key by the authentication proxy server from the master session key.

10. The method as claimed in claim 9, wherein the user-specific mobile key forms a part of the master session key.

11. The method as claimed in claim 9, wherein the user-specific mobile key is identical to the transmitted master session key.

12. The method as claimed in claim 9, wherein said deriving of the user-specific mobile key uses at least one of a cryptographic key derivation function and a cryptographic hash function.

13. The method as claimed in claim 1, wherein the forwarding of the authentication message is performed in accordance with a radius data transmission protocol.

14. The method as claimed in claim 1, wherein the forwarding of the authentication message is performed in accordance with a diameter data transmission protocol.

15. The method as claimed in claim 1, wherein the access network is a WiMax access network.

16. The method as claimed in claim 1, wherein the intermediate network is a WiMax intermediate network.

17. The method as claimed in claim 1, wherein the home network is a 3GPP network.

18. The method as claimed in claim 1, wherein the home network is a wide local area network.

19. The method as claimed in claim 1, wherein each of the authenticating subscriber identification, registering subscriber identification and stored subscriber identification is a network access identifier.

20. The method as claimed in claim 1, further comprising providing, to a proxy mobile Internet protocol client of the access network, whichever of the group-specific mobile key or user-specific mobile key is provided or derived.

21. The method as claimed in claim 1, wherein several intermediate networks are located between the access network and the home network.

22. The method as claimed in claim 21, wherein the authentication proxy server is provided in the home network or in one of the intermediate networks.

23. The method as claimed in claim 1, further comprising determining by the authentication proxy server whether the authentication server of the home network supports a Mobile Internet Protocol functionality.

24. An authentication proxy server in an intermediate network, providing a mobile key via at least the intermediate network for cryptographic protection of a mobile signaling message to a home agent in a home network or in one of at least one intermediate network for communication with a mobile subscriber terminal, comprising:
- a storage unit; and
- at least one programmed processor, coupled to said storage unit, in the authentication proxy server in the intermediate network
- establishing a radio connection with the mobile subscriber terminal and an access network,
- receiving, from the home agent in the home network or in one of at least one intermediate network, a key request message for a mobile key, the key request message containing a registering subscriber identification from a registration request message sent to the home agent by a registering subscriber terminal,
- assigning, after successful authentication of a subscriber by an authentication server of the home network as indicated by an authentication message containing an authenticating subscriber identification as a result of receiving at least one authentication message, that contains the authenticating subscriber identification from the access network at the home network of the subscriber, a group-specific mobile key to the authenticating subscriber identification if the authenticating subscriber identification is already stored in said storage unit,
- deriving a user-specific mobile key by the authentication proxy server and assigning the user-specific mobile key to the authenticating subscriber identification, if the authenticating subscriber identification is not stored in the authentication proxy server, and
- providing the group-specific mobile key or the user-specific mobile key to the home agent.

25. The authentication proxy server as claimed in claim 24, wherein said at least one programmed processor further deletes the user-specific mobile key after a first predetermined lifetime.

26. The authentication proxy server as claimed in claim 25, wherein said at least one programmed processor further deletes the group-specific mobile key after a second predetermined lifetime, longer than the first predetermined lifetime.

27. The authentication proxy server as claimed in claim 24, wherein said at least one programmed processor further deletes the user-specific mobile key after provision of the user-specific mobile key for the home agent.

28. The authentication proxy server as claimed in claim 24, wherein said at least one programmed processor, further updates a time stamp associated with the authenticating subscriber identification and sets an associated flag indicating that the mobile key is the group-specific mobile key, if the authenticating subscriber identification contained in the authentication message is already stored in said storage unit.

29. The authentication proxy server as claimed in claim 24, wherein said at least one programmed processor, further randomly generates the group-specific mobile key.

30. The authentication proxy server as claimed in claim 24, wherein the authentication server in the home network is connected to the authentication proxy server.

31. The authentication proxy server as claimed in claim 30, wherein said at least one programmed processor further derives the user-specific mobile key from a master session key obtained from the authentication server of the home network.

32. The authentication proxy server as claimed in claim 30, wherein the home network is a 3GPP network.

33. The authentication proxy server as claimed in claim 30, wherein the home network is a wide local area network.

34. The authentication proxy server as claimed in claim 24, wherein the authentication proxy server is a WiMax authentication proxy server.

35. The authentication proxy server as claimed in claim 24, wherein the at least one programmed processor further determines whether the authentication proxy server supports a Mobile Internet Protocol functionality.

\* \* \* \* \*